United States Patent
Desai et al.

(10) Patent No.: US 8,326,882 B1
(45) Date of Patent: Dec. 4, 2012

(54) ENVIRONMENT MANAGEMENT INTERFACE FOR MANAGEMENT OF A HETEROGENEOUS STORAGE ENVIRONMENT

(75) Inventors: Munish Desai, Shrewsbury, MA (US); Tara Halwes, Boston, MA (US); Bruce Rabe, Dedham, MA (US); Neil Schutzman, Marlborough, MA (US); Scott Von Rhee, Boston, MA (US); Nancy Welch, Charlton, MA (US)

(73) Assignee: EMC Corporation, Hopkinton, MA (US)

( * ) Notice: Subject to any disclaimer, the term of this patent is extended or adjusted under 35 U.S.C. 154(b) by 591 days.

(21) Appl. No.: 12/567,031

(22) Filed: Sep. 25, 2009

(51) Int. Cl.
 *G06F 7/00* (2006.01)
 *G06F 17/30* (2006.01)
(52) U.S. Cl. .................................. 707/792; 707/805
(58) Field of Classification Search ............. 707/792, 707/805
 See application file for complete search history.

(56) References Cited

U.S. PATENT DOCUMENTS

| 7,502,669 | B1 | 3/2009 | Evans et al. |
| 7,529,744 | B1* | 5/2009 | Srivastava et al. ............... 1/1 |
| 2005/0216481 | A1* | 9/2005 | Crowther et al. ........... 707/100 |

OTHER PUBLICATIONS

"EMC Celerra NX4," EMC Corporation, Data Sheet, 2008.
"EMC CLARiiON CX Series," EMC Corporation, Data Sheet, 2004.

* cited by examiner

*Primary Examiner* — Fred I Ehichioya
*Assistant Examiner* — Kris Mackes
(74) *Attorney, Agent, or Firm* — BainwoodHuang (57) ABSTRACT

A heterogeneous data storage environment includes a first and second data storage system where the first data storage system includes management functionalities that are distinct from the management functionalities included by the second data storage system. A storage system management device is displays an environment management interface that dynamically changes based upon a user's need to manage either the first or second storage system. For example the storage system management device provides a default environment management interface for the first data storage system that includes a custom management display that allows the user to access the management functionalities associated with the first data storage system. The storage system management device dynamically changes the content of the environment management interface to provide a custom management display associated with the user selection of a second data storage system.

18 Claims, 5 Drawing Sheets

ENVIRONMENT MANAGEMENT INTERFACE FOR MANAGEMENT OF A HETEROGENEOUS STORAGE ENVIRONMENT

BACKGROUND

A typical data storage system stores and retrieves data for one or more external host devices. Conventional data storage systems typically include processing circuitry and a set of disk drives electrically coupled to the processing circuitry. The processing circuitry includes one or more ports, such as Ethernet ports, that allow the host devices to connect to the processing circuitry. The processing circuitry is typically configured to perform load and store operations on the set of disk drives on behalf of the host devices.

In certain cases, an enterprise can utilize different types of storage systems to form a complete data storage environment. For example, an enterprise can utilize both a storage area network (SAN), such as a CLARiiON™ system (produced by EMC Corporation, Hopkinton, Mass.), and a network attached storage (NAS) stations, such as a Celerra™ system (produced by EMC Corporation, Hopkinton, Mass.) as part of the complete data storage environment.

SUMMARY

The use of different types of storage systems as part of an enterprise's data storage environment can suffer from a variety of deficiencies. Conventional data storage environments typically include a system management device, such as a computerized device, disposed in electrical communication with each of the storage systems that form the data storage environment. For example, assume a data storage environment includes both a CLARiiON™ system and a Celerra™ system electrically coupled to a common system management device. However, each of the storage systems can include different and separate functionalities. Accordingly, each storage system can include its own graphical management interface for interaction with the corresponding subsystem. For example, each of the CLARiiON™ system and Celerra™ system includes its own distinct and separately executable graphical management interface displayed to an end user by the system management device.

In order to interact with and manage the CLARiiON™ system and the Celerra™ system, the end user must learn to operate each of the graphical management interfaces for each of the storage systems. Because the CLARiiON™ and Celerra™ systems can include both common and unique functionalities presented by the graphical management interfaces in graphically different ways, the learning of both interfaces can be time consuming. Additionally, as newer versions of the CLARiiON™ and Celerra™ systems are added to an enterprise, the end user can be required to learn and operate the new versions of the graphical management interfaces while maintaining knowledge of the existing graphical management interfaces of the data storage systems.

By contrast, embodiments of the present invention are related to an environment management interface for management of a heterogeneous storage environment. A heterogeneous storage environment includes a first and second data storage system where the first data storage system includes management functionalities that are distinct from the management functionalities included by the second data storage system. A storage system management device is disposed in electrical communication with the heterogeneous storage environment and displays an environment management interface that dynamically changes based upon a user's need to manage either the first or second storage system.

For example, during operation, the storage system management device provides a default environment management interface for the first data storage system that includes a custom management display that allows the user to access the management functionalities associated with the first data storage system. In order to manage a different storage system, the user can select a different storage system from a list of the storage systems included as part of the heterogeneous storage environment. When the user selects a particular storage system from the list, such as the second storage system, the storage system management device dynamically changes the content of the environment management interface to provide a custom management display associated with the selected second data storage system. The custom management display for the second data storage system allows the user to access the particular management functionalities associated with the selected second data storage system. With such an environment management interface, the user can access all of the necessary management content for a heterogeneous storage environment from a single graphical user interface.

In one arrangement, a storage system management device is configured to provide an environment management interface for a selected data storage system of a set of data storage systems. The storage system management device is configured to display as part of the environment management interface a first management display arrangement associated with a first data storage system of the set of data storage systems, the first management display arrangement having a set of navigation controls to provide user navigation to storage management functions associated with the first data storage system. The storage system management device is configured to receive a system selection command, the system selection command associated with a second data storage system of the set of data storage systems. The storage system management device is configured to dynamically adjust the environment management interface to display a second management display arrangement associated with the second data storage system of the set of data storage systems in response to receiving the system selection command, the second management display arrangement having the set of navigation controls configured to provide user navigation to storage management functions associated with the second data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention are related to an environment management interface for management of a heterogeneous storage environment. A heterogeneous storage environment includes a first and second data storage system where the first data storage system includes management functionalities that are distinct from the management functionalities included by the second data storage system. A storage system management device is disposed in electrical communication with the heterogeneous storage environment and displays an environment management interface that dynamically changes based upon a user's need to manage either the first or second storage system.

For example, during operation, the storage system management device provides a default environment management interface for the first data storage system that includes a custom management display that allows the user to access the management functionalities associated with the first data storage system. In order to manage a different storage system, the user can select a different storage system from a list of the storage systems included as part of the heterogeneous storage environment. When the user selects a particular storage system from the list, such as the second storage system, the storage system management device dynamically changes the content of the environment management interface to provide a custom management display associated with the selected second data storage system. The custom management display for the second data storage system allows the user to access the particular management functionalities associated with the selected second data storage system. With such an environment management interface, the user can access all of the necessary management content for a heterogeneous storage environment from a single graphical user interface.

Figure 1:
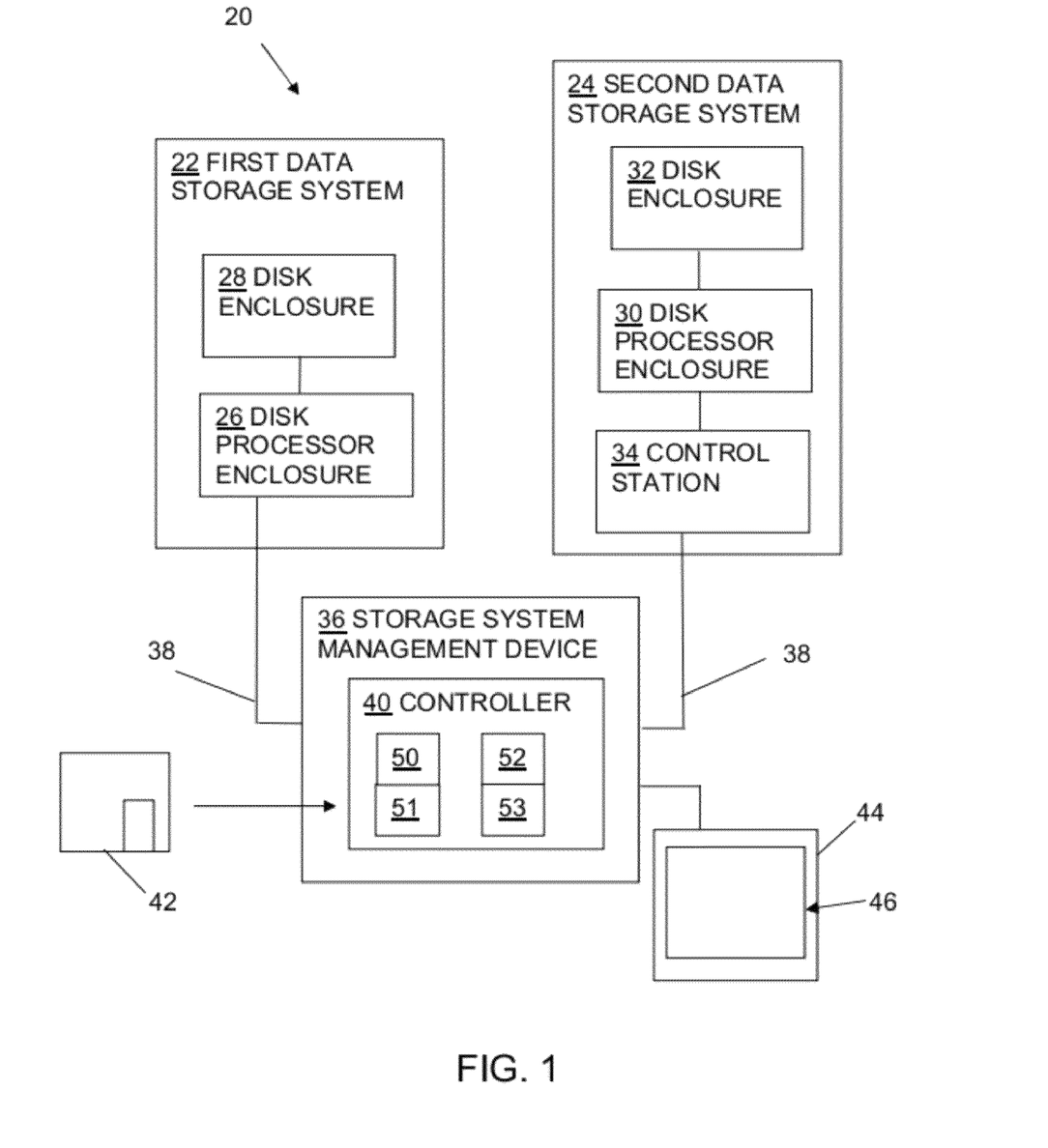
FIG. 1 illustrates a schematic representation of a set of data storage systems having a storage system management device disposed in electrical communication with each data storage system of the set.

FIG. 1 illustrates an example arrangement of a data storage environment 20, such as used by an enterprise. As shown, the data storage environment 20 includes set of data storage systems, such as a first data storage system 22 and a second data storage system 24. While the first and second data storage systems 22, 24 can be configured in a variety of ways, in one arrangement, the first and second data storage systems 22, 24 are configured as heterogeneous data storage systems such that the first data storage system 22 includes management functionalities that are distinct from the management functionalities included by the second data storage system 24. For example, in one arrangement, the first data storage system 22 is configured as a storage area network, such as a CLARiiON™ system and the second data storage system 24 is configured as having a network attached storage station, such as a Celerra™ system. As will be shown below, each of the CLARiiON™ system and the Celerra™ system include certain distinct management functionalities.

The first data storage system 22, in one arrangement, includes a disk processor enclosure 26 and one or more disk enclosures 28 electrically coupled to the disk processor enclosure. Each of the disk enclosures 28 includes an array of magnetic memory units, such as disk drives or flash drives.

For example, each of the disk enclosures 28 includes several disk drives operable to store data received from a host device or to provide data requested from the host device. The disk processor enclosure 26 includes one or more controllers or storage processors configured to control certain functions of the first data storage system 22. For example, the storage processor is configured to perform load and store operations on the magnetic storage devices of the disk enclosures 28 on behalf of the host device.

The second data storage system 24 includes a disk processor enclosure 30 and one or more disk enclosures 32 electrically coupled to the disk processor enclosure 30. The second data storage system 24 also includes a control station 34, such as a network attached storage station, electrically coupled to the disk processor enclosure 30.

The data storage environment 20 also includes a storage system management device 36 disposed in electrical communication with each of the first and second data storage systems 22, 24. The storage system management device 36 can electrically communicate with the first and second data storage systems 22, 24 in a variety of ways. For example, in the case where the storage system management device 36 is located at the site of the first and second data storage systems 22, 24, the storage system management device 36 can be disposed in electrical communication with the first and second data storage systems 22, 24 via cables 38. Additionally, the storage system management device 36 can be disposed in electrical communication with the first and second data storage systems 22, 24 by way of a network connection, such as a remote network connection.

The storage system management device 36 is configured as a computerized device that includes a controller 40, such as a memory and a processor. In one arrangement, the controller 40 stores a storage system management application. The storage system management application installs on the storage system management device 36 from a computer program product 42. In some arrangements, the computer program product 42 is available in a standard off-the-shelf form such as a shrink wrap package (e.g., CD-ROMs, diskettes, tapes, etc.). In other arrangements, the computer program product 42 is available in a different form, such downloadable online media. For example, the storage system management application can be downloaded from a web server on the set of data storage systems 20 when the storage system management device 36 is connected via a web browser. When performed on the controller 40 of the storage system management device 36, the storage system management application causes the storage system management device 36 to cause a display device 44, such as a monitor, to display an environment management interface 46 having one of a first management display arrangement and a second management display arrangement.

The storage system management device 36 is configured to provide and dynamically change the environment management interface 46, such as a graphical user interface (GUI), to provide a user with the appropriate management content for a single storage system 22 or 24 in the heterogeneous storage environment 20. As will be described in detail below, the storage system management device 36 dynamically changes a management display arrangement such that the environment management interface 46 presents a user with the appropriate management functionality and options when the user selects a particular data storage system 22 or 24 for management and/or monitoring.

Figure 2:
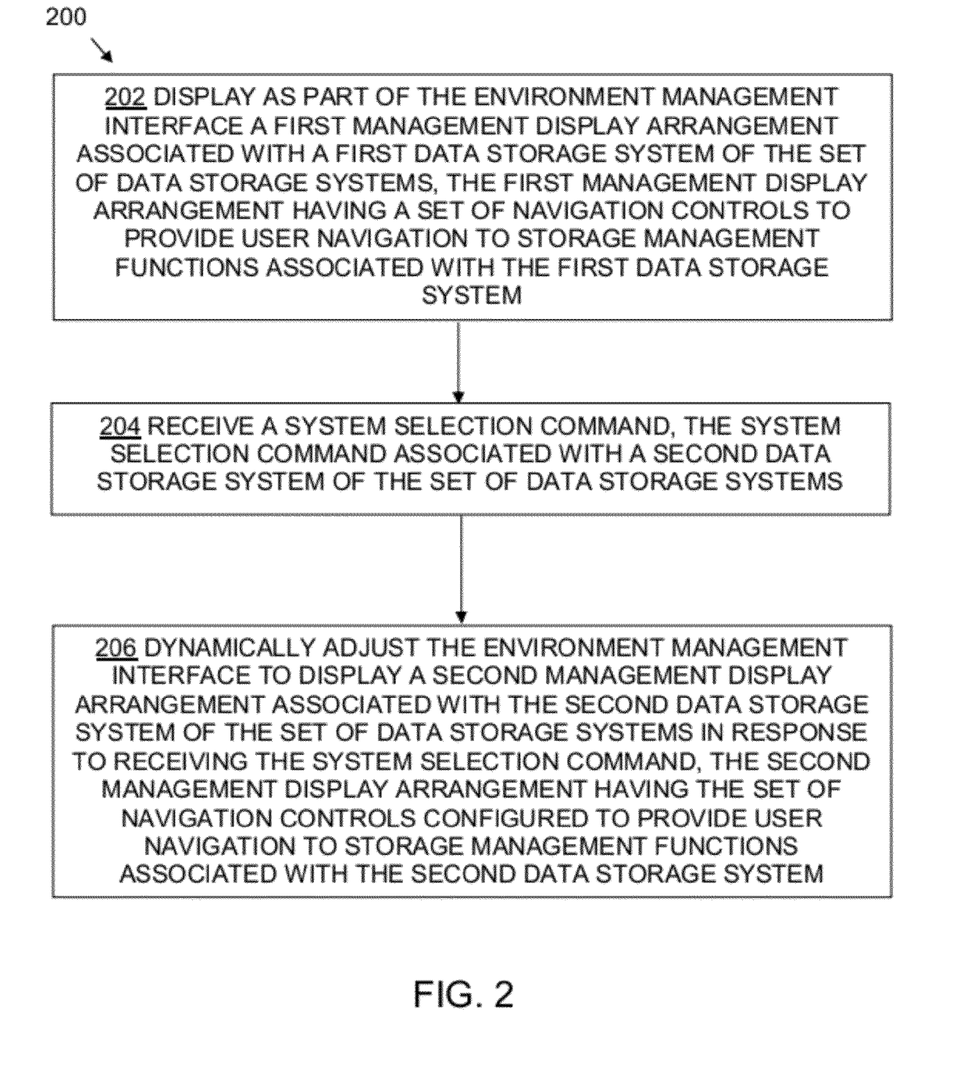
FIG. 2 is a flowchart that illustrates a procedure performed by the storage system management device of FIG. 1.

FIG. 2 is a flowchart 200 that illustrates a procedure performed by the storage system management device 36 when graphically displaying an environment management interface for a selected data storage system of the set of data storage systems 20.

In step 202, the storage system management device 44 displays as part of the environment management interface 46 a first management display arrangement associated with a first data storage system 22 of the set of data storage systems, the first management display arrangement having a set of navigation controls 62 to provide user navigation to storage management functions associated with the first data storage system 24.

With reference to FIG. 1, during operation, an application framework of the storage system management device 36 initially passively receives or actively retrieves a management function library (i.e., a plug-in) from each of the data storage systems monitored by the storage system management device 36 and stores the management function libraries in the controller 40. For example, the storage system management device 36 receives a first management function library 50 from the first data storage system 22 and a second management function library 52 from the second data storage system 24. Each management function library implements all of the management functions for its corresponding storage system. For example, the first management function library 50 implements the management functions associated with the first data storage system 22 while the second management function library 52 implements the management functions associated with the second data storage system 24. The framework and the first management function library 50 define the storage system management application for the first data storage system 22 while the framework and the second management function library 52 define the storage system management application for the second data storage system 24.

Once the storage system management device 36 has received the management function libraries 50, 52 for the data storage systems 22, 24 associated with the data storage environment 20, the storage system management device 36 utilizes the management function library of a default data storage system to generate an environment management interface 46 having a management display arrangement associated with the default data storage system. For example, assume the storage system management device 36 is configured, by default, to display the environment management interface 46 to allow a user to manage the first data storage system 22, such as a CLARiiON™ system. In such a case, the storage system management device 36 utilizes the management function library 50 in conjunction with the framework to generate and display the environment management interface 46 as having a management display arrangement 60 that allows a user to access the management functionalities associated with the first data storage system 24 (i.e. the CLARiiON™ system).

Figure 3:
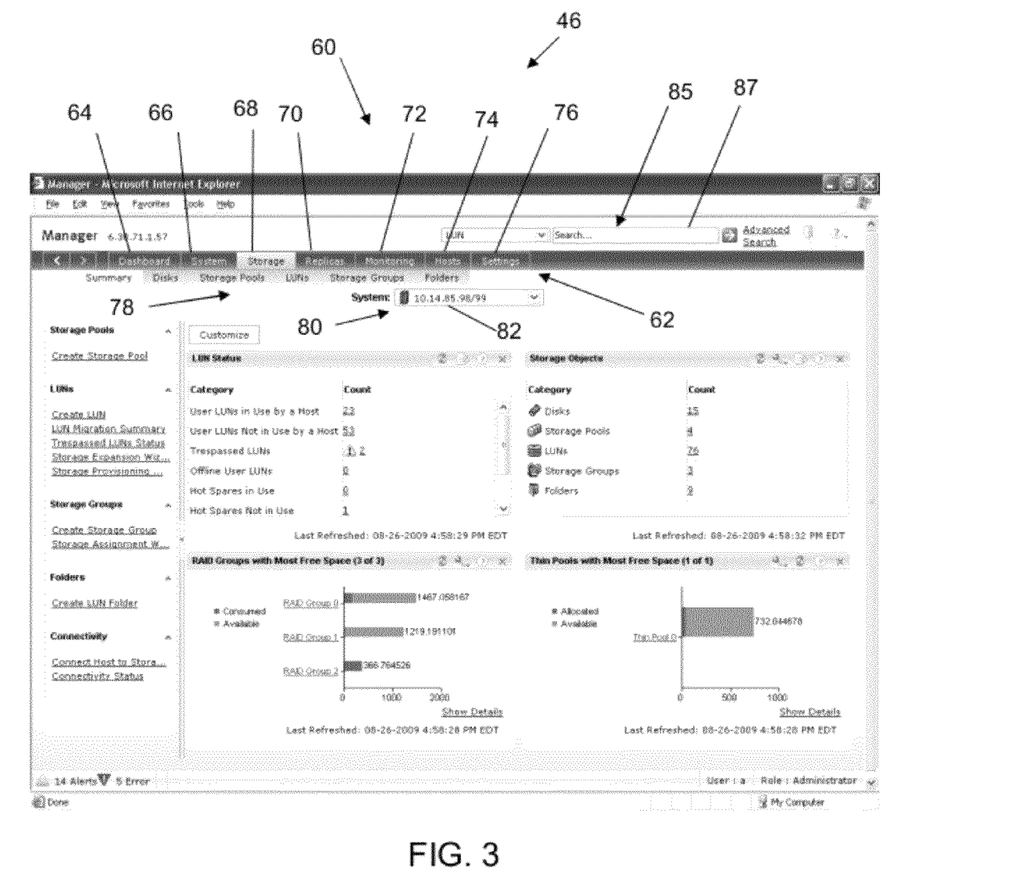
FIG. 3 illustrates an environment management interface as provided by the storage system management device of FIG. 1, the environment management interface displaying a first management display arrangement associated with a first data storage system of the set.

For example, FIG. 3 illustrates the environment management interface 46 having the management display arrangement 60 for the first data (i.e., CLARiiON™) system 24. In one arrangement, based upon the information carried by the management function library 50, the management display arrangement 60 includes a set of navigation controls or user-selectable sections 62 that allow the user to access the functionalities of the first data storage system 24 and content associated with each of the set of sections 62.

For example, the navigation controls 62 of the management display arrangement 60 includes a Dashboard section 64 that provides information regarding the devices within the data storage environment 20 (e.g., the first and second data storage systems 22, 24), a System section 66 that provides information regarding the particular data storage systems within the data storage environment 20, and a Storage section 68 that provides information regarding the status of data storage devices and logical unit numbers (LUNs) of Small Computer System Interface (SCSI) logical units associated with the first data storage system 24. The management display arrangement 60 also includes a Replica section 70 that provides information regarding mirrors or clones associated with the first data storage system 24, a Monitoring section 72 that provides information regarding particular events associated with the first data storage system 24, a Hosts section 72 that provides information regarding a host device disposed in electrical communication with the first data storage system 24, and a Settings section 76 that provides information regarding security settings or domain settings, for example, associated with the first data storage system 24. In one arrangement, each section 62 can include one or more subsections 78 that further refines the management functionalities into categories and that facilitates the user in finding a particular functionality.

Returning to FIG. 2, in step 204, the storage system management device 36 receives a system selection command, the system selection command associated with a second data storage system 24 of the set of data storage systems. While the storage system management device 36 can receive the system selection command in a variety of ways, in one arrangement, the storage system management device 36 provides a user with the ability to select a data storage system (e.g., a data storage system other than the default data storage system) through the environment management interface 46.

For example, with reference to FIG. 1, as the storage system management device 36 retrieves the management function libraries 50, 52 from the respective first and second data storage systems 22, 24, each management function library 50, 52 includes attribute information 51, 53, such as a data storage system name, a system platform identifier (e.g., CLARiiON™ or Celerra™), and a system platform version identifier 51, 53 associated with each data storage system 22, 24. The storage system management device 36 stores the attribute information as part of a list of data storage system elements where each element in the list of data storage systems configured as a managed storage object. Further, in order to allow a user to select a particular data storage system 24 for management, the storage system management device 36 provides the list of managed storage objects as part of the environment management interface 46. In one arrangement, with reference to FIG. 3, the environment management interface 46 provides the managed storage objects 80 as part of a pull-down menu 82, such as a Java™ combo box menu. Each of the managed storage objects 80 represent a data storage system managed by the storage system management device 36, such as the first and second data storage systems 22, 24.

In use, in the environment management interface 46 illustrated, in order to select the second data storage system 24 for management, a user accesses the pull-down menu 82 and selects the managed storage object 80 corresponding to the second data storage system 24. The storage system management device 36 receives the selection of the managed storage object 80 corresponding to the second data storage system 24 as the aforementioned system selection command.

Returning to FIG. 2, in step 206, the storage system management device 36 dynamically adjusts the environment management interface 46 to display a second management display arrangement associated with the second data storage system 24 of the set of data storage systems 20 in response to receiving the system selection command 80, the second management display arrangement having the set of navigation controls 86 configured to provide user navigation to storage management functions associated with the second data storage system 24.

The storage system management device 36 can dynamically adjust the environment management interface 46 in a variety of ways. In one arrangement, in response to receiving the system selection command 80 indicating user selection of the second data storage system 24, the storage system management device 36 retrieves the management function library 52 associated with the second data storage system 24 from the controller 40. The storage system management device 36 utilizes the management function library 52, in conjunction with the framework, to adjust the management display arrangement of the environment management interface 46 such that a newly generated management display arrangement 84 allows a user to access the management functionalities associated with the second data storage system 24 (i.e. the Celerra™ system).

Figure 4:
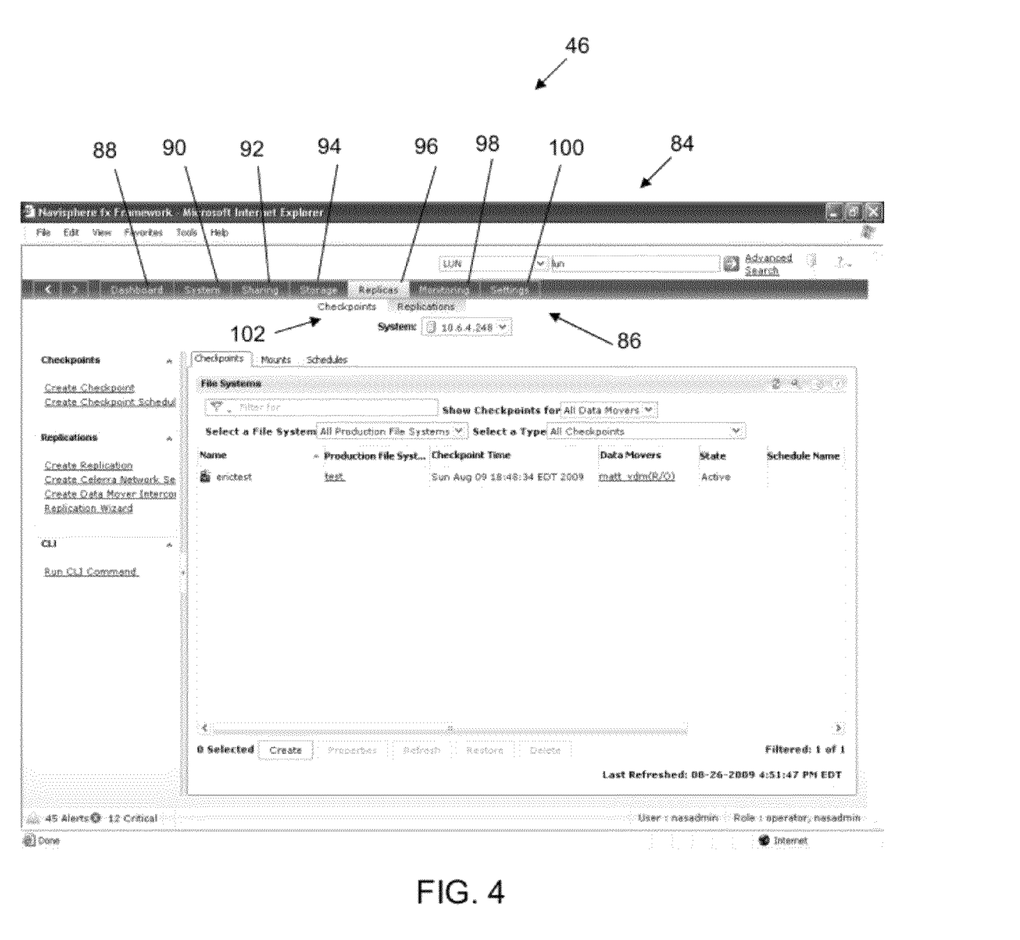
FIG. 4 illustrates an environment management interface as provided by the storage system management device of FIG. 1, the environment management interface displaying a second management display arrangement associated with a second data storage system of the set.

For example, FIG. 4 illustrates the environment management interface 46 having the management display arrangement 84 for the second data (i.e., Celerra™) system 24. In one arrangement, based upon the information carried by the management function library 52, the management display arrangement 84 includes a set of navigation controls or user-selectable sections 86 that allow the user to access the functionalities of the second data storage system 24 and content associated with each of the set of sections 86. For example, the navigation controls 86 of the management display arrangement 84 includes a Dashboard section 88, a System section 90, a Sharing section 92, a Storage section 94, a Replicas section, a Monitoring section 98, and a Settings section 100. In one arrangement, each of the navigation controls 84 can include one or more subsections 102 that further refines the management functionalities into categories and that facilitates the user in finding a particular functionality associated with the second data storage system 24.

The environment management interface 46 allows a user to select and access, from a single graphical user interface, the management functionalities associated with a selected data storage system of a heterogeneous storage environment 20. With such an interface 46, a user is not required to learn and master different management interfaces for the variety of data storage systems that form the heterogeneous storage environment 20.

As indicated above, when the storage system management device 36 receives a system selection command 80, the device 36 dynamically adjusts the environment management interface 46 from displaying a first management display arrangement 60 having navigation controls 62 to displaying a second management display arrangement 82 having navigation controls 86. In one arrangement, prior to dynamically adjusting the environment management interface 46, the storage system management device 36 is configured to compare an attribute associated with the first data storage system 22 with an attribute associated with the selected second data storage system 24.

For example, with reference to FIGS. 1 and 3, assume the case where storage system management device 36 displays an environment management interface 46 having a management display arrangement 60 for a first CLARiiON™ system of the data storage environment 20. Further assume the storage system management device 36 receives, from a user, a selection of a managed storage object 80 corresponding to a second CLARiiON™ system of the data storage environment 20. In response to receiving the managed storage object 80, the storage system management device 36 compares the system platform identifier attribute 51 (i.e., CLARiiON™ system) of the first data storage system with the system platform identifier attribute 53 (i.e., CLARiiON™ system) of the second data storage system. Because the system platform identifier attribute 51 of the first data storage system is the same (i.e., substantially the same) as the system platform identifier attribute 53 of the second data storage system, the storage system management device 36 maintains the interface 46 display of the set of navigation controls, as well as the functionality of the set of navigation controls, when displaying the management display arrangement 60 for the selected second CLARiiON™ system of the data storage environment 20.

In another example, with reference to FIGS. 1 and 3, assume the case where storage system management device 36 displays an environment management interface 46 having a management display arrangement 60 for a CLARiiON™ system having a first system platform version identifier 51 (e.g., version 1). Further assume the storage system management device 36 receives, from a user, a selection of a managed storage object 80 corresponding to a second CLARiiON™ system having a second system platform version identifier 53 (e.g., version 2). In response to receiving the managed storage object 80, the storage system management device 36 compares first system platform version identifier 51 (e.g., version 1) of the first data storage system with the second platform version identifier 53 (e.g., version 2). Because the first system platform version identifier 51 of the first data storage system different from the second system platform version identifier 53 of the second data storage system, the storage system management device 36 displays as part of the interface 46 an updated set (i.e., dynamically changed) of navigation controls 86 as part of the second management display arrangement 84, the functionality of the set of navigation controls 86 of the second management display arrangement corresponding to functional requirements of the second data storage system 24.

In one arrangement, with reference to FIG. 4, certain management function libraries are configured to support a search functionality 85 that allows a user to search a corresponding data storage system for particular information. In one arrangement, as long as a single management function library within the data storage environment 20 supports the search functionality, the environment management interface 46 is configured to display the search functionality 85 as part of an environment management interface 46. For example, prior to displaying the environment management interface 46, for each management function library 50, 52, the environment management interface 46 detects, as an attribute 51, 53 a data search functionality associated with each data storage system 22, 24. In the case where at least one management function library 50, 52 and associated data storage system 22, 24 supports the data search functionality 85, such as data storage system 22, the storage system management device includes a data search window 87 as part of the environment management interface 46 for all systems 22, 24. Furthermore, in the case where the data storage system 22 supports the data search functionality 85, the data search window 87 of the environment management interface 46 is operable. In the case where a data storage system 24 does not support the data search functionality 85, the data search window 87 of the environment management interface 46 is inoperable.

While various embodiments of the invention have been particularly shown and described, it will be understood by those skilled in the art that various changes in form and details may be made therein without departing from the spirit and scope of the invention as defined by the appended claims.

For example, FIG. 1 illustrates the data storage environment 20 as including a first data storage system 22 and a second data storage system 24. Such illustration is by way of example only. It should be understood that the data storage environment 20 can include any number of data storage systems. Further, it should be understood that the storage system management device 36 can provide an environment management interface 46 that allows a user to dynamically manage any number of data storage systems to which the management device 36 is connected.

Figure 5:
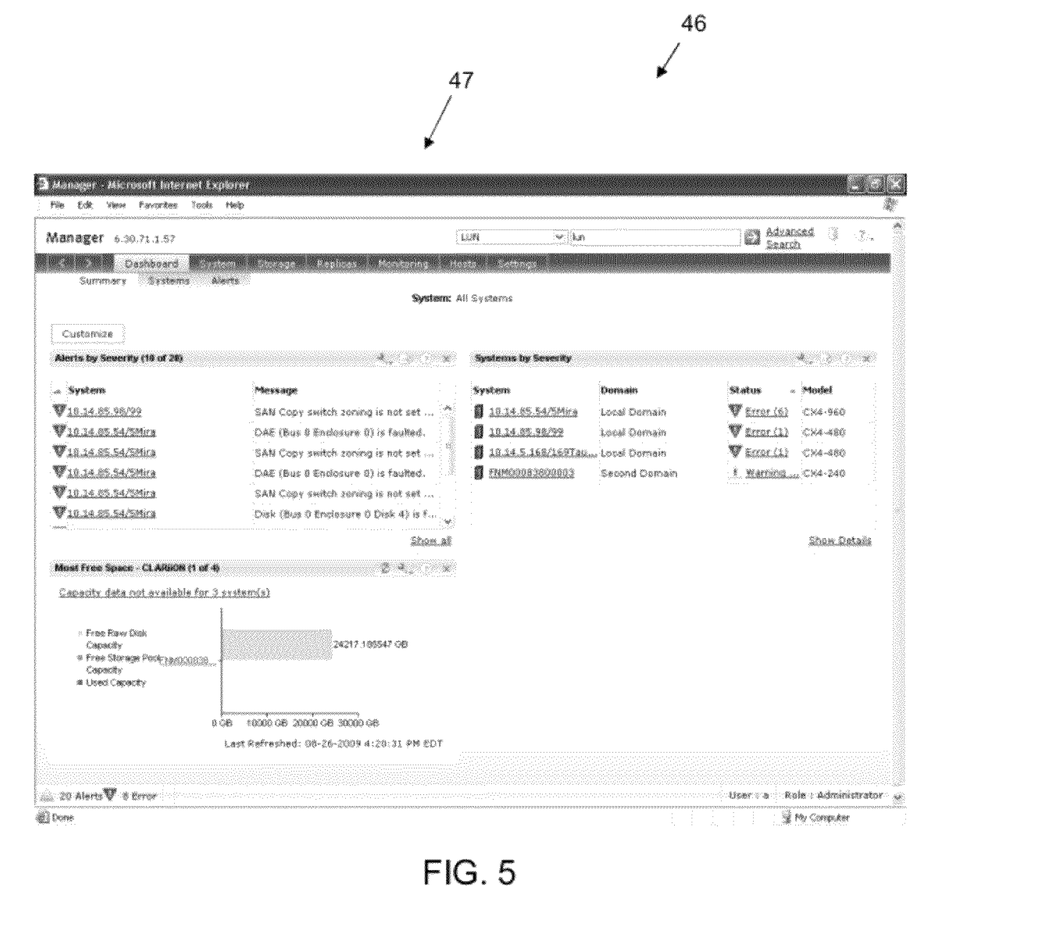
FIG. 5 an environment management interface as provided by the storage system management device of FIG. 1, the environment management interface displaying an aggregate of data related to a storage environment.

As described above, once the storage system management device 36 has received the management function libraries 50, 52 for the data storage systems 22, 24, the storage system management device 36 utilizes the management function library of a default data storage system to generate an environment management interface 46 having a management display arrangement associated with the default data storage system. Such description is by way of example only. In one arrangement, with reference to FIG. 6, once the storage system management device 36 has received the management function libraries 50, 52 for the data storage systems 22, 24, the storage system management device 36 utilizes the management function libraries 50, 52 from both of the data storage systems 22, 24 to generate an environment management interface 46 having an aggregate management display arrangement 47 that displays an aggregate of data related to the data storage environment 20 (e.g., the first and second data storage systems 22, 24). In one arrangement, the aggregate management display arrangement 47 displays data that is common to the systems being managed by the storage system management device, such as data that is common to the first and second data storage systems 22, 24. In one arrangement, the aggregate management display arrangement 47 allows a user to select a particular data storage system 22, 24 for further monitoring.

What is claimed is:

1. In a storage system management device, a method of providing an environment management interface for a data storage system of a set of data storage systems, comprising:

displaying, as part of the environment management interface, by the storage system management device, a first management display arrangement associated with a first data storage system of the set of data storage systems, the first management display arrangement having a set of navigation controls to provide user navigation to storage management functions associated with the first data storage system;

receiving, by the storage system management device, a system selection command, the system selection command associated with a second data storage system of the set of data storage systems;

dynamically adjusting the environment management interface, by the storage system management device, to display a second management display arrangement associated with the second data storage system of the set of data storage systems in response to receiving the system selection command, the second management display arrangement having the set of navigation controls configured to provide user navigation to storage management functions associated with the second data storage system;

in response to receiving the system selection command, comparing, by the storage system management device, an attribute associated with the first data storage system with an attribute associated with the selected second data storage system;

when the attribute associated with the first data storage system is the same as the attribute associated with the second data storage system, maintaining, by the storage system management device, the display of the set of navigation controls of the first management display arrangement as part of the second management display arrangement of the environment management interface, the functionality of the set of navigation controls of the second management display arrangement corresponding to the functionality of the set of navigation controls of the first management display arrangement; and when the attribute associated with the first data storage system is different from the attribute associated with the second data storage system, displaying, by the storage system management device, an updated set of navigation controls as part of the second management display arrangement, the functionality of the set of navigation controls of the second management display arrangement corresponding to functional requirements of the second data storage system.

2. The method of claim 1, comprising, prior to displaying as the environment management interface the first management display arrangement:

retrieving, by the storage system management device, a first management function library associated with the first data storage system of the set of data storage systems; and utilizing, by the storage system management device, the first management function library associated with the first data storage system to generate the environment management interface having the first management display arrangement associated with the first data storage system.

3. The method of claim 2, wherein dynamically adjusting the environment management interface to display the second management display arrangement, comprises:

retrieving, by the storage system management device, a second management function library associated with the second data storage system of the set of data storage systems; and utilizing, by the storage system management device, the second management function library associated with the second data storage system to dynamically adjust the environment management interface to display the second management display arrangement associated with the second data storage system.

4. The method of claim 1, wherein comparing, by the storage system management device, the attribute associated with the first data storage system with the attribute associated with the selected second data storage system comprises comparing a system platform identifier associated with the first data storage system with a system platform identifier associated with the second data storage system.

5. The method of claim 1, wherein comparing, by the storage system management device, the attribute associated with the first data storage system with the attribute associated with the selected second data storage system comprises comparing a system platform version identifier associated with the first data storage system with a system platform version identifier associated with the second data storage system.

6. The method of claim 1, comprising:

displaying as part of the environment management interface, by the storage system management device, a list of data storage system elements, each element in the list of data storage systems configured as a managed storage object and each element in the list of data storage systems associated with a data storage system of the set of data storage systems; and receiving the system selection command comprises receiving, by the storage system management device, a selection of a data storage element in the list of data storage systems.

7. The method of claim 1, comprising:
detecting, by the storage system management device, a data search functionality associated with each data storage system of the set of data storage systems; and
when at least one data storage system of the set of data storage systems supports the data search functionality, displaying, by the storage system management device, a data search window as part of the environment management interface.

8. The method of claim 1, comprising prior to displaying, as part of the environment management interface the first management display arrangement, by the storage system management device, displaying, by the storage system management device, an aggregate management display arrangement that includes an aggregate of data related to the first data storage system and the second data storage system.

9. The method of claim 8, wherein displaying, by the storage system management device, the aggregate management display arrangement comprises displaying, by the storage system management device, data that is common to both the first data storage system and the second data storage system.

10. A storage system management device of a data storage system, comprising:
at least one communications interface; and
a controller electrically coupled to the at least one communications interface wherein the controller is configured to:
display as part of the environment management interlace a first management display arrangement associated with a first data storage system of the set of data storage systems, the first management display arrangement having a set of navigation controls to provide user navigation to storage management functions associated with the first data storage system;
receive a system selection command, the system selection command associated with a second data storage system of the set of data storage systems;
dynamically adjust the environment management interface to display a second management display arrangement associated with the second data storage system of the set of data storage systems in response to receiving the system selection command, the second management display arrangement having the set of navigation controls configured to provide user navigation to storage management functions associated with the second data storage system;
in response to receiving the system selection command, the controller is configured to compare an attribute associated with the first data storage system with an attribute associated with the selected second data storage system;
when the attribute associated with the first data storage system is the same as the attribute associated with the second data storage system, the controller is configured to maintain a display of the set of navigation controls of the first management display arrangement as part of the second management display arrangement of the environment management interface, the functionality of the set of navigation controls of the second management display arrangement corresponding to the functionality of the set of navigation controls of the first management display arrangement; and
when the attribute associated with the first data storage system is different from the attribute associated with the second data storage system, the controller is configured to display an updated set of navigation controls as part of the second management display arrangement, the functionality of the set of navigation controls of the second management display arrangement corresponding to functional requirements of the second data storage system.

11. The storage system management device of claim 10, wherein the controller, prior to displaying as the environment management interface the first management display arrangement, is configured to:
retrieve a first management function library associated with the first data storage system of the set of data storage systems; and
utilize the first management function library associated with the first data storage system to generate the environment management interface having the first management display arrangement associated with the first data storage system.

12. The storage system management device of claim 11, wherein when dynamically adjusting the environment management interface to display the second management display arrangement, the controller is configured to:
retrieve a second management function library associated with the second data storage system of the set of data storage systems; and
utilize the second management function library associated with the second data storage system to dynamically adjust the environment management interface to display the second management display arrangement associated with the second data storage system.

13. The storage system management device of claim 10, wherein when comparing the attribute associated with the first data storage system with the attribute associated with the selected second data storage system, the controller is configured to compare a system platform identifier associated with the first data storage system with a system platform identifier associated with the second data storage system.

14. The storage system management device of claim 10, wherein when comparing the attribute associated with the first data storage system with the attribute associated with the selected second data storage system, the controller is configured to compare a system platform version identifier associated with the first data storage system with a system platform version identifier associated with the second data storage system.

15. The storage system management device of claim 10, wherein:
the controller is configured to display as part of the environment management interface a list of data storage system elements, each element in the list of data storage systems configured as a managed storage object and each element in the list of data storage systems associated with a data storage system of the set of data storage systems; and
when receiving the system selection command, the controller is configured to receive a selection of a data storage element in the list of data storage systems.

16. The storage system management device of claim 10, wherein the controller is configured to:
detect a data search functionality associated with each data storage system of the set of data storage systems; and
when at least one data storage system of the set of data storage systems supports the data search functionality, the controller is configured to display a data search window as part of the environment management interface.

17. The storage system management device of claim 10, wherein the controller, prior to displaying as the environment management interface the first management display arrangement, is configured to display an aggregate management display arrangement that includes an aggregate of data related to the first data storage system and the second data storage system.

18. A non-transitory computer-readable medium having computer program logic encoded thereon that, when performed on a controller of a storage system management device causes the storage system management device to:
  display as part of the environment management interface a first management display arrangement associated with a first data storage system of the set of data storage systems, the first management display arrangement having a set of navigation controls to provide user navigation to storage management functions associated with the first data storage system;
  receive a system selection command, the system selection command associated with a second data storage system of the set of data storage systems;
  dynamically adjust the environment management interface to display a second management display arrangement associated with the second data storage system of the set of data storage systems in response to receiving the system selection command, the second management display arrangement having the set of navigation controls configured to provide user navigation to storage management functions associated with the second data storage system;
  in response to receiving the system selection command, comparing, by the storage system management device, an attribute associated with the first data storage system with an attribute associated with the selected second data storage system;
  when the attribute associated with the first data storage system is the same as the attribute associated with the second data storage system, maintaining, by the storage system management device, the display of the set of navigation controls of the first management display arrangement as part of the second management display arrangement of the environment management interface, the functionality of the set of navigation controls of the second management display arrangement corresponding to the functionality of the set of navigation controls of the first management display arrangement; and
  when the attribute associated with the first data storage system is different from the attribute associated with the second data storage system, displaying, by the storage system management device, an updated set of navigation controls as part of the second management display arrangement, the functionality of the set of navigation controls of the second management display arrangement corresponding to functional requirements of the second data storage system.

* * * * *